United States Patent Office 3,275,438

Patented Sept. 27, 1966

3,275,438

PREPARATION OF MAGNETIC RECORDS INCLUDING THE USE OF PHOTOGRAPHIC TECHNIQUES

Simon Levin, 123 W. 44th St., New York, N.Y.

No Drawing. Continuation of application Ser. No. 186,851, Apr. 12, 1962. Division of application Ser. No. 833,999, Aug. 17, 1959. This application Feb. 16, 1965, Ser. No. 433,195

10 Claims. (Cl. 96—35)

This application is a continuation of abandoned application Serial No. 186,851, filed April 12, 1962, and is a division of abandoned application Serial No. 833,999, filed August 17, 1959.

The invention relates to methods for making space-time magnetic records from non-magnetic space-time records and wherein the representative information content may extend from zero frequency, through the so-called audio range and beyond the range of what is known as the video spectrum.

Conventional methods of magnetic recording are so well known that they will be dealt with here but briefly. In the recording and reproducing of sound or video frequencies, a magnetic medium is transported in inductive relationship with a magnetizable head and the magnetic fluctuations are converted to electrical signals. This process is governed by the ratio of the tape velocity to the signal frequency, the recording of the sound frequencies requiring low to medium tape velocities and the recording of video frequencies requiring high tape velocities or, as in some apparatus where the tape record is moved slowly, the magnetizing heads are moved at high velocity transversely to the record. The conventional video signal is recorded as a wide band of frequencies usually comprising a carrier, the modulation, the consequent side bands and synchronizing signals.

It is an object of the invention to provide methods for producing magnetic records from nonmagnetic records which are representative of sound frequencies.

It is another object of the invention to provide methods producing magnetic records from nonmagnetic records which are representative of a wide frequency band such as picture or video information.

It is another object of the invention to provide methods for producing magnetic records from nonmagnetic records which are comprised of images formed by radiant energy means.

In one feature in accordance with the invention, a radiant energy sensitive medium is differentially exposed to radiant energy rays derived from apparatus which modulate said rays in any preferred manner such as, for example, fluctuations in conformance with sound signals or as fluctuations of a complexity sufficient to provide a television picture. The information of the television picture may be recorded on the radiant energy sensitive medium as a modulated complex waveform or may be impressed as individual frames in the same manner as with a conventional motion picture camera. After exposure of the medium, the images are converted to images comprised of a magnetic medium. This original may be utilized as a magnetic record or duplicate magnetic records may be made from it in any quantity by means, for example, of the apparatus described in said parent application.

The foregoing objects and further objects and characteristics of the invention will be clearly discernible from the following description, and appended claims:

*Example 1*

Suitable in the practice of the invention is a radiant energy sensitive metallic salt such as a silver halide in a vehicle such as gelatine, polyvinyl alcohol, polymers, resins, or the like. After exposure to signal information or in a camera as hereinbefore described the silver salt is reduced, by any known method, so that silver remains in the differentially exposed areas. Either the metallic silver or the unexposed halide may be converted.

When utilizing a metallic silver image, the unexposed silver halide is removed by a fixer such as a standard hypo bath. The remaining silver is thoroughly washed and then bleached with a ferricyanide as, for example, potassium or sodium ferricyanide to produce a suspension of silver ferrocyanide which is a substantially insoluble silver salt. To replace the silver, the salt of a polyvalent metal which is in its higher valence form such as ferric chloride or ferric sulphate, is reacted with the silver ferrocyanide to form a water insoluble ferric ferrocyanide. Any remaining silver salts are removed by a weak solution of sodium hyposulphite. The foregoing steps are well known in the art and there are many formulas that may be utilized.

It is desirable that the ferric ion and ferrous ion be present simultaneously so that ultimately there is precipitated a hydrated ferrosoferric oxide. A suitable proportion of ferrous ion to ferric ion is approximately 1:2 to 1:4 respectively. Since the quantity of ferric ion is determined by the nature and density of the image a few trials may be necessary to determine the concentration of the solution necessary to provide the ferrous ion. The ferric ferrocyanide image is now reacted with a ferrous chloride solution and an excess of aqueous ammonia. Thereafter the image is immersed in 5% solution of sodium hydroxide for several minutes and then washed. In most cases a 5% solution of ferrous chloride may be utilized and the reaction readily accomplished at temperatures in the range of 18° C. to 22° C. although other temperatures will give good results provided a vehicle is used which will not be injured by the processing temperature. A ferrosoferric oxide is precipitated which now comprises the image originally metallic silver.

*Example 2*

If the silver halide portion of the differentially exposed image is to be converted, thte metallic silver image is dissolved by a silver solvent such as a dichromate solution or the like. After thorough washing the remaining silver halide is rendered to a more insoluble silver salt by being reacted with a coupler compound such as, for example, 2-thiobarbituric acid in an aqueous alkaline solution to produce a water insoluble silver thiobarbiturate image. The rendering of soluble silver salts to corresponding insoluble silver salts is well known to the art and any such reactions may be utilized provided the silver may be thereafter replaced with the higher valence form of a polyvalent metal, in this instance iron.

The silver thiobarbituric image is reacted with a solution comprised of 5 parts 10% ferric chloride and 3 parts 2% N hydrochloric acid in 200 parts water to form a ferric thiobarbiturate image. The ferric ion now present will be determined as stated previously, by substantially the density and nature of the image and a few trials may be necessary to establish the concentration of the solution to provide the ferrous ion. A 5% ferrous chloride solution and then an excess of aqueous ammonia and then a 5% solution of sodium hydroxide is utilized as described in Example 1 to provide a ratio of 1:2 ferrous to ferric ion thereby producing a magnetizable image in the place of the silver halide image. In some instances, ratios of ferrous to ferric ion as high as 1:5 will be found suitable.

*Example 3*

Photosensitive metallic salts such as, for example, ferric ammonium citrate, ferric ammonium oxalate or ferric acetate may be employed in place of the silver salts.

Wherever the ferric salts are exposed, the action of the radiant energy converts the ferric salt to a ferrous salt. There may be included with the photosensitive ferric salts a water soluble ferricyanide, such as potassium, ammonium or sodium ferricyanide, to react with the ferrous salts and there will be produced an insoluble ferricyanide of iron which may exist as ferric ferrocyanide. This reaction is accomplished at the same time that the unexposed ferric salts are removed by washing in water as is well known in the art. The washing should be thorough so as to remove any unreacted salts the presence of which may produce unwanted precipitates during the next step in the process. As in the Examples 1 and 2 above, the last named images are then reacted with a 5% ferrous chloride solution and then an excess of aqueous ammonia and a solution of sodium hydroxide to precipitate the ferrosoferric oxide.

The use of wetting and dispersing agents are recommended in all of the foregoing examples.

*Example 4*

Suitable also in the practice of the invention is a gelatine silver halide emulsion which is differentially exposed and reduced in conventional manner to a metallic silver image. Instead of reacting the silver or the unexposed silver salts to a magnetic image, the emulsion is converted first to a gelatine relief by any of the means well known to the art, there being allowed to remain a gelatine image in place of the silver image or a gelatine image of the areas of the silver halide salts. For example, the exposed emulsion is reduced in a tanning type developer so that the gelatine about the silver image is substantially hardened. The silver is bleached and removed and the emulsion then washed in hot water which dissolves the unhardened gelatine thereby forming the relief image.

A wetting agent, cyclo-aliphatic, sulphonated oleylalcohol or the like, is applied so that the emulsion is thoroughly penetrated. The emulsion is then bathed in a 2% solution of basic ferric acetate dissolved in acetic acid so that the relief image is again permeated. The emulsion is next immersed in a solution of 1 part $FeSO_4+7H_2O$ in 8 parts of water and agitated so that the solution penetrates the relief. A short rinse in water removes excess products. A solution of 5 parts ammonium hydroxide 28% solution and 3 parts potassium nitrate 1% in 10 parts of water is now reacted with the emulsion which is thereafter immersed in a 5% solution of sodium hydroxide for several minutes and there is precipitated the ferrous ferrite which may be magnetized.

The relief emulsion is then washed in water. In place of the basic ferric acetate, a 10% solution of ferric chloride may be utilized. Repeating the steps subsequent to the formation of the relief image will provide a means for increasing the volume of magnetic material introduced into the relief image.

A magnetizable image may also be produced by permeating the relief with a salt of a metal selected from the group consisting of the ferromagnetic elements, for example, nickel and/or cobalt and then reducing with agents such as ammonium and sodium hydroxide to which hydrazine or hypophosphite compounds or both have been added. For example, the relief is bathed in an activating agent such as a .1% solution of one of the salts of the platinum group metals, for example, platinic chloride until thoroughly permeated. The activating agent serves as a sensitizer and catalyst to initiate and accelerate the reduction reaction of the ferromagnetic salt. The activating agent itself may be first reduced to its metal in the relief with reducers such as a 1% solution of hydrazine or sodium hypophosphite and then proceeding with the reduction of the ferromagnetic salts in the presence of the reduced activating agent or the activating agent in solution may be allowed to remain in the relief which is then immersed directly into a bath containing, for example, a 1% solution of nickel and/or cobalt salts such as the chlorides or sulphates and reducing agents such as a 1% solution of hydrazine sulphate or sodium hypophosphite and a 2% solution of sodium hydroxide in equal parts. The product of the reduction will be the ferromagnetic metal in the metallic state. Varying the proportions of the ferromagnetic salts in the solution will vary the proportion of the deposited metals. Sequestering agents such as Rochelle salts may be utilized to advantage to retain the metal salts in solution prior to reduction. The rate at which the magnetizable image may be deposited may be accelerated by heating to a temperature, for example, of 140° F.

The foregoing reduction of the metal salt is substantially an autocatalytic process. Deposition of the metal causes further deposition. The activating agent initiates and accelerates the reduction reaction and its use is advantageous when the substrate is non-metallic. In addition to platinum, other sensitive activators are well known such as palladium, tin, copper, silver, nickel, cobalt, and iron.

*Example 5*

In lieu of a relief image layer formed in gelatine with light sensitive salts, the relief image may be formed by means of radiant energy sensitive resins, polymers or polymeric resins, as for example, bichromated shellac, resins from monoethylenically unsaturated compounds, cinnamal ketones, a cinnamoyl group in the form of an ester or chalcone grouping, or the like. A radiant energy sensitive medium such as described may serve as a vehicle for reactive agents that may be converted to a magnetic material subsequent to the formation of the relief image.

Fifteen parts by weight of ferric metahydroxide, of a colloidal mesh, is thoroughly dispersed to form a suspension in 100 parts of a photosensitive resin, polymer or polymeric resin which may be selected from the group above and for which acetone or ether for example is a solvent. Eight parts by weight of ferrous chloride is dissolved in acetone and added with constant stirring. Sensitizers and dispersing agents may be included. The resulting composition is coated on a suitable support and dried to a uniform thickness. The coating is exposed to radiant energy information by any means known in the art. The exposed areas become hardened or less soluble to solvents. The coating is bathed in ether and is selectively dissolved in the unexposed areas carrying away the iron compound dispersed in these areas. The iron compound in the hardened parts of the coating is not disturbed being insoluble in a solvent such as ether. The coating is dried so as to remove all solvents and then reacted with aqueous ammonia and sodium hydroxide until a precipitate is formed in the relief. After drying it may be magnetized.

The ferric metahydroxide of the above may be replaced with ferric chloride provided suitable solvents are selected which will not remove the iron salts from the hardened areas during the formation of the relief image. Because of the volatile nature of ether and the desirability of employing a conventional closed system reacting apparatus, a non-aqueous reducing agent may be preferable to ammonia or sodium hydroxide in aqueous solution. For example 5 parts naphthalene and 1 part sodium dissolved in 25 parts of dimethyl glycol ether may be utilized to produce the magnetic precipitate which will be mainly iron in the metallic state. Other ferromagnetic salts may be substituted as the suspension in the radiant energy sensitive resin in lieu of ferric metahydroxide and ferrous chloride.

The transparent quality of this example coating during the exposure period will permit reliefs to be rendered in great detail and with a long scale of gradation. This is not possible in conventional methods of making relief images wherein an opaque magnetic oxide is incorporated initially in the coating and is present during exposure thereby obstructing a large fraction of the photosensitive material.

A relief image is substantially a raised pattern having areas thereof at levels different from levels of other areas thereof and in the practice of the invention may be produced in a permeable carrier medium as shown by the examples herein or by any other means known in the art.

In the foregoing, some emphasis has been placed on the formation of magnetic images from photographic or like images, but it should be understood that the invention is not limited exclusively to images obtained by photographic means. In the practice of the invention, it is obvious that magnetic images may be produced from non-magnetic patterns which are initially formed in the record medium by etching, embossing, screening, engraving, stenciling or like means and that the carrier media shown in any example are suitable for use with the reactions shown in any of the other examples.

What is claimed is:

1. The method of producing a magnetic record which comprises providing at least one radiant energy sensitive ferric salt dispersed in a permeable substantially water-insoluble carrier medium, differentially exposing said carrier medium to rays of radiant energy representing information to be stored in said medium whereby said ferric salt is converted to a ferrous salt image corresponding to said radiant energy information, removing unexposed ferric salt from said carrier medium and reducing said ferrous salt image to a magnetic iron oxide image.

2. The method of producing a magnetic record which comprises forming a raised pattern in a non-magnetic permeable carrier medium, said raised pattern representing information to be stored in said carrier medium, permeating said carrier medium with a solution of a salt of a polyvalent ferromagnetic metal in a higher valence form and a salt of said polyvalent ferromagnetic metal in a lower valence form; and reducing said salts to a magnetic oxide.

3. The method of producing a magnetic record which comprises exposing a silver halide suspension medium to rays of radiant energy to provide a latent image, processing said latent image to form a silver image, removing the remaining silver halide from said suspension, reacting said silver image with a salt of a polyvalent ferromagnetic metal to form a substantially insoluble salt image in a higher valence form, reacting said higher valence salt image with a salt of a polyvalent ferromagnetic metal in a lower valence form and reducing the product of said last step to a magnetic oxide whereby said silver image is converted to a magnetizable image.

4. The method of producing a magnetic record which comprises providing at least one salt of a metal selected from the group consisting of the ferromagnetic elements in suspension in a radiant energy sensitive polymeric carrier medium, differentially exposing said carrier to rays of radiant energy representing information to be stored in said carrier, removing the unexposed areas of said carrier whereby a raised pattern of said information is formed in said carrier and reducing said salt remaining in said raised pattern to a magnetizable state.

5. The method producing a magnetic record which comprises providing a non-magnetic permeable carrier medium, permeating said carrier medium with at least one salt of a metal selected from the group consisting of the ferromagnetic elements and reducing said metal salt to the metallic state whereby said non-magnetic carrier medium is transformed into a magnetizable carrier medium.

6. The method of producing a magnetic record which comprises providing a non-magnetic permeable carrier medium, permeating said carrier medium with at least one first activating salt selected from the group consisting of the activating metals for initiating and accelerating the reduction of a ferromagnetic metal salt to its metal, reducing said first metal salt to a metallic state, then permeating said carrier medium with at least one second salt of a metal selected from the group consisting of the ferromagnetic elements; and reducing said second salt to the metallic state whereby said non-magnetic carrier medium is transformed to a magnetizable carrier medium.

7. In the production of a magnetic record medium the method steps which comprise forming a raised pattern in a permeable carrier medium, said raised pattern representing information to be stored in said carrier medium, permeating said raised pattern with at least one activating metal salt selected from the group consisting of the catalytic metals for initiating and accelerating the reduction of a ferromagnetic metal salt to its metal, reducing said activating metal salt to a metallic state, combining in solution at least one salt of a metal selected from the group consisting of the ferromagnetic elements with a reducing agent for reducing said ferromagnetic metal salt to the metallic state and a sequestering agent for inhibiting reduction of said ferromagnetic metal salt prior to permeating said raised pattern, then permeating said raised pattern with said solution whereby said activating metal initiates the reduction of said ferromagnetic metal salt to the metallic state.

8. The method of producing a magnetic record which comprises exposing a silver halide suspension medium to rays of radiant energy to provide a latent image, developing said latent image to form a silver image, dissolving remaining silver halide from said medium, forming an image in relief corresponding to said silver image and removing said silver from said medium, permeating said medium with at least one salt of a metal selected from the group consisting of the ferromagnetic elements, and reducing said ferromagnetic metal salt to the metallic state thereby forming a magnetizable image.

9. The method of producing a magnetic record as claimed in claim 8 wherein there is included the step of permeating said medium with at least one activating metal salt selected from the group consisting of the catalytic metals for initiating and accelerating the reduction of a ferromagnetic metal salt to its metal and reducing said activating metal salt to a metallic state prior to the permeating of said medium with said ferromagnetic metal salt.

10. In the production of a magnetic record medium the method steps which comprise forming a raised pattern in a permeable carrier medium, said raised pattern representing information to be stored in said carrier medium, permeating said raised pattern with at least one activating metal salt selected from the group consisting of the activating metals for initiating and accelerating the reduction of a ferromagnetic metal salt to its metal, reducing said activating metal salt to a metallic state, permeating said raised pattern with at least one ferromagnetic compound reducible to the metallic state by a reducing agent selected from the group consisting of hydrazine, a hydrazine salt, a derivative of hydrazine, a hypophosphite, a hydrosulphite, an alkali metal, an alkali metal hydroxide, ammonium hydroxide, a glycol, naphthalene; and reducing said ferromagnetic metal compound to the metallic state.

References Cited by the Examiner

UNITED STATES PATENTS

| | | | |
|---|---|---|---|
| 2,582,590 | 1/1952 | Heeren et al. | |
| 2,823,999 | 2/1958 | Hamm | 96—27 |
| 3,110,592 | 11/1963 | Schwerin et al. | 96—35 |
| 3,136,638 | 6/1964 | Schwerin et al. | 96—92 |
| 3,169,065 | 2/1965 | Sorkin et al. | 96—35 |

NORMAN G. TORCHIN, *Primary Examiner.*

A. D. RICCI, *Assistant Examiner.*